(12) United States Patent
Bouiller et al.

(10) Patent No.: US 7,555,894 B2
(45) Date of Patent: Jul. 7, 2009

(54) SWIVELLING EXHAUST NOZZLE FOR AN AIRCRAFT ENGINE

(75) Inventors: Philippe Pierre Vincent Bouiller, Samoreau (FR); Michel Francois Raymond Franchet, Mayet (FR); Jean-Pierre Ruis, Le Chatelet En Brie (FR)

(73) Assignee: Snecma, Paris (FR)

( * ) Notice: Subject to any disclaimer, the term of this patent is extended or adjusted under 35 U.S.C. 154(b) by 494 days.

(21) Appl. No.: 11/409,087

(22) Filed: Apr. 24, 2006

(65) Prior Publication Data

US 2006/0236676 A1 Oct. 26, 2006

(30) Foreign Application Priority Data

Apr. 26, 2005 (FR) ................... 05 04154

(51) Int. Cl.
*F02K 1/00* (2006.01)
(52) U.S. Cl. .......................... 60/232; 60/228
(58) Field of Classification Search .................. 60/232, 60/771, 228; 239/265.19, 265.33, 265.35
See application file for complete search history.

(56) References Cited

U.S. PATENT DOCUMENTS

| 3,302,885 | A | | 2/1967 | Herbert |
| 3,367,108 | A | | 2/1968 | Camboulives |
| 4,363,445 | A | * | 12/1982 | Bouiller et al. ........ 239/265.35 |
| 6,938,408 | B2 | * | 9/2005 | Lair ........................... 60/226.2 |
| 7,216,476 | B2 | * | 5/2007 | Fink ............................ 60/232 |

FOREIGN PATENT DOCUMENTS

FR 2 776 338 9/1999

* cited by examiner

*Primary Examiner*—Michael Cuff
*Assistant Examiner*—Andrew Nguyen
(74) *Attorney, Agent, or Firm*—Oblon, Spivak, McClelland, Maier & Neustadt, P.C.

(57) ABSTRACT

Swivelling nozzle for an aircraft engine, the nozzle 10 being pivotally mounted about a transverse yaw axis by means of two elastically deformable one-piece articulations 24 mounted on two external pivots 22 of the nozzle and housed in engine case elements, the nozzle being caused to pivot by an actuator 46 mounted on the engine case and connected by a link 50 to a pivot 22 of the nozzle.

16 Claims, 3 Drawing Sheets

SWIVELLING EXHAUST NOZZLE FOR AN AIRCRAFT ENGINE

FIELD OF THE INVENTION

The invention relates to a swivelling exhaust nozzle for an aircraft engine.

BACKGROUND OF THE INVENTION

It has already been proposed to equip an aircraft engine with a swivelling nozzle not only to improve the stealthiness of the aircraft by eliminating the rudders but also to improve its manoeuvrability.

A known solution, described for example in U.S. Pat. No. 3,726,480, consists in mounting a swivelling nozzle on a support structure by means of a deformable annular joint of lamellar structure which is arranged between the upstream end of the nozzle and the support structure and which extends right around the circumference of the nozzle. However, this joint has relatively large dimensions and is bulky, heavy and expensive.

The subject of the invention is particularly a swivelling exhaust nozzle for an aircraft engine that has a simple, lightweight and inexpensive structure and can be manoeuvred easily.

SUMMARY OF THE INVENTION

To this end, it proposes a swivelling exhaust nozzle for an aircraft engine, comprising means for pivoting the nozzle about at least one transverse axis on an external engine case and means for displacing the nozzle about the said transverse axis, characterized in that the pivoting means comprise two diametrically opposed coaxial pivots outside the nozzle, at least one of these pivots being connected to the external engine case by an elastically deformable one-piece articulation.

By transverse axis of the nozzle is meant an axis perpendicular to the longitudinal axis of the nozzle. The vertical transverse pivoting axis of the nozzle is the yaw axis and the horizontal transverse pivoting axis of the nozzle is the pitch axis.

Advantageously, each pivot is connected to the external engine case by an elastically deformable one-piece articulation.

This deformable articulation has relatively very small dimensions and is lightweight, has a simple structure, is inexpensive and is easy to mount outside the nozzle.

The means for displacing the nozzle about the transverse axis comprise at least one actuator mounted outside the nozzle on the case and connected to a pivot of the nozzle. This actuator is, for example, of the screw type and is actuated by at least one electric motor and, preferably, by two electric motors which are mounted in parallel and operated such that one of these motors can overcome a failure of the other motor.

In a preferred embodiment of the invention, the or each elastically deformable articulation comprises two blocks of elastically deformable material which are diametrically opposed with respect to the pivoting axis and are each mounted between the pivot and a case element, one end of the blocks being rotationally fixed to the case element and their other end being rotationally fixed to the pivot.

An articulation of this type is simpler and lighter than a traditional bearing, for example a rolling bearing, has no risk of seizing, requires no maintenance and can be stored for a long period of time, and additionally returns the nozzle elastically to an initial position.

In a first embodiment, each block of the articulation is made of elastomer and has the shape of a cylindrical sector centred on the pivoting axis.

Preferably, each block has a lamellar or laminated structure and comprises an alternating arrangement of elastomer layers and metal strips which are rigidly attached to one another, for example by adhesive bonding.

The upstream end of the nozzle has the shape of a segment of a sphere centred on the pivoting axis and is guided by a correspondingly shaped end part of the external engine case.

This correspondence in terms of shape not only enables the nozzle to be guided during its pivoting movement but also provides sealing between the external engine case and the upstream end of the nozzle.

Advantageously, the or each elastically deformable articulation is accommodated in a housing which is formed by the case element and by a cap and which has an air inlet in its upstream part and an air outlet in its downstream part, so as to establish a stream of cooling air over the articulation when the aircraft is in flight.

In a conventional manner, the transverse pivoting axis of the nozzle is a yaw axis and the angular deflection of the nozzle about this axis is about 15° on either side of a central position.

Generally, the invention has a number of key advantages over the prior art:
- the aircraft can be stored over a long period of time without maintenance,
- the nozzle pivoting mechanism is very simple and particularly reliable,
- its mass is low,
- the manoeuvrability of the aircraft is improved,
- eliminating the rudders means that its stealthiness is improved as well.

The invention also relates to a drone equipped with such a swivelling nozzle.

BRIEF DESCRIPTION OF THE DRAWINGS

The invention will be better understood and other features, details and advantages thereof will become more clearly apparent on reading the description below given with reference to the appended drawings, in which.

DETAILED DESCRIPTION OF THE DRAWINGS

Figure 1:
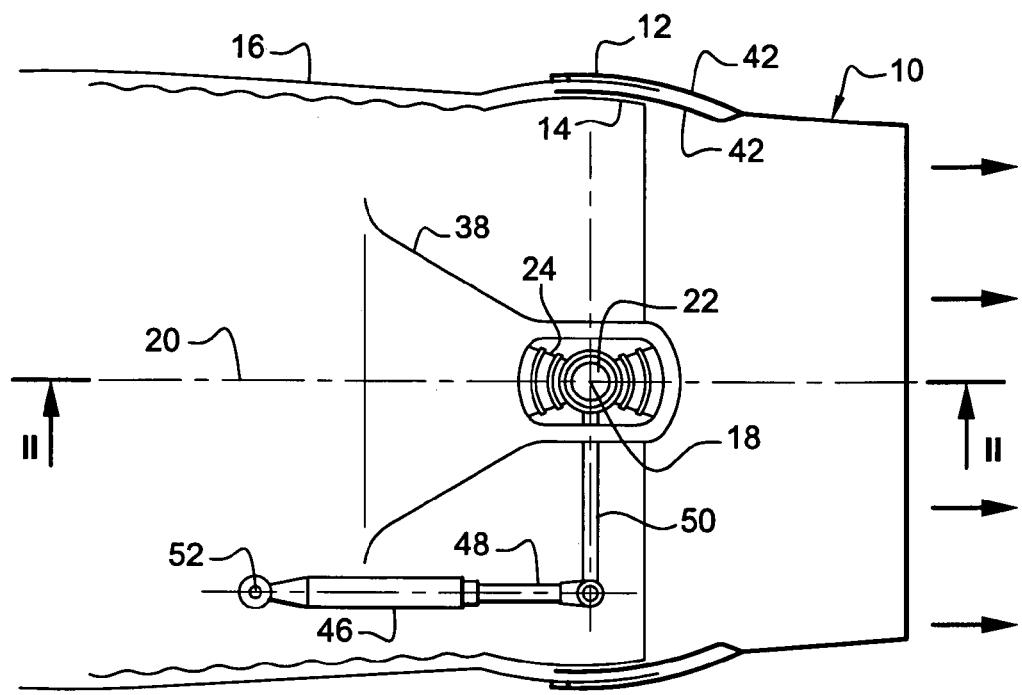
FIG. 1 is a schematic plan view partially in section of a swivelling nozzle according to the invention.

In FIG. 1, the exhaust nozzle of an engine of an aircraft, such as a drone, is mounted at its upstream end 12 on the downstream end 14 of a case element forming a duct 16 for expelling engine combustion gases in the direction indicated by the arrows.

The nozzle 10 is articulated on the duct 16 about a transverse axis 18, which is a yaw axis of the aircraft, it being possible by swivelling the nozzle in one direction or the other about the axis 18 to direct the aircraft to the left or right with respect to the longitudinal axis 20 of the engine and also to eliminate the rudders to improve the stealthiness of the aircraft.

The upstream end 12 of the nozzle bears two diametrically opposed cylindrical pivots 22 which are outside the nozzle and which are centred and guided in rotation on parts of the duct 16 by means of elastically deformable one-piece articulations 24 of a commercially available type.

Figure 3:
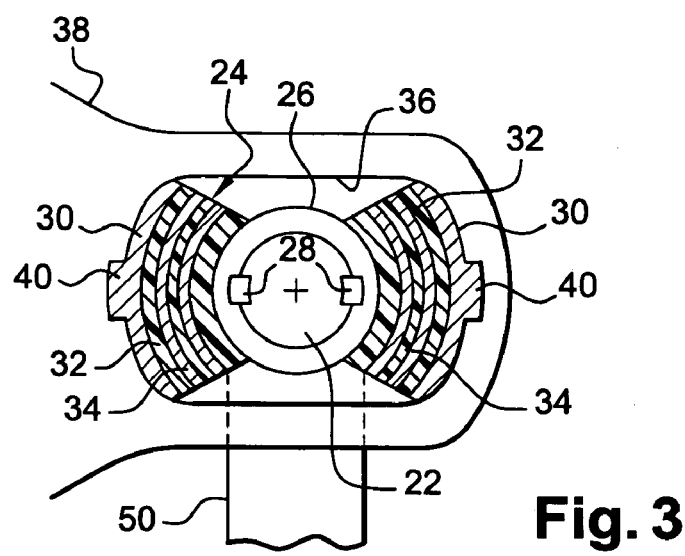
FIG. 3 is a sectional schematic view of a an elastic articulation according to the invention.

Each articulation 24 mounted on a pivot 22 comprises (FIG. 3) an inner cylindrical ring 26 fitted over the pivot 22 and fixed rotationally therewith by means of one or two keys 28 or any other suitable means, and an outer ring formed by two diametrically opposed cylinder sectors 30 which surround the inner ring 26 and which are connected thereto by an alternating arrangement of elastomer layers 32 and metal strips 34, imparting a lamellar or laminated structure to the articulation 24.

The elastomer layers 32, of which there are three in the example represented, and the metal strips 34, of which there are two, are cylinder sectors and are fastened to one another by adhesive bonding, the radially external and radially internal elastomer layers being fastened by adhesive bonding to the external ring 30 and to the internal ring 26, respectively.

The external ring 30 of the articulation is mounted non-rotatably in a passage 36 of a lug 38 which is rigidly attached to the duct 16. In cross section this passage 36 has an elongate shape corresponding to the external shape of the articulation 24. Furthermore, two ribs 40 are formed so that they project from the external faces of the cylinder sectors 30 and are received in corresponding grooves of the passage 36, thereby preventing any rotation of the articulation 24 inside this passage.

The upstream end 12 of the nozzle 10 has at least one wall 42 in the form of a segment of a sphere which is centred on the pivoting axis 18 and guided on a correspondingly shaped wall of the downstream end 14 of the duct 16. To achieve better sealing of the junction between the downstream end 14 of the duct 16 and the upstream end 12 of the nozzle 10, the wall 42 in the form of a segment of a sphere belonging to the upstream end of the nozzle is a double wall, as is the wall in the form of a segment of a sphere belonging to the downstream end 14 of the duct 16, and these double walls are engaged in one another as represented schematically in the drawing to form a labyrinth seal.

The pivoting movement of the nozzle about the axis 18 is controlled by a suitable motor-operated means, such as an actuator 46 as represented in FIG. 1, which is mounted on the duct 16 outside the latter and which extends in the downstream direction parallel to the longitudinal axis 20 of the engine, the piston rod 48 of this actuator being connected to one of the pivots 22 by means of a link 50 having one end fixed rotationally to the pivot 22 and the other end articulated on the piston rod 48, the body of the actuator 46 being articulated at its opposite end, at 52, on the duct 16.

Figure 4:
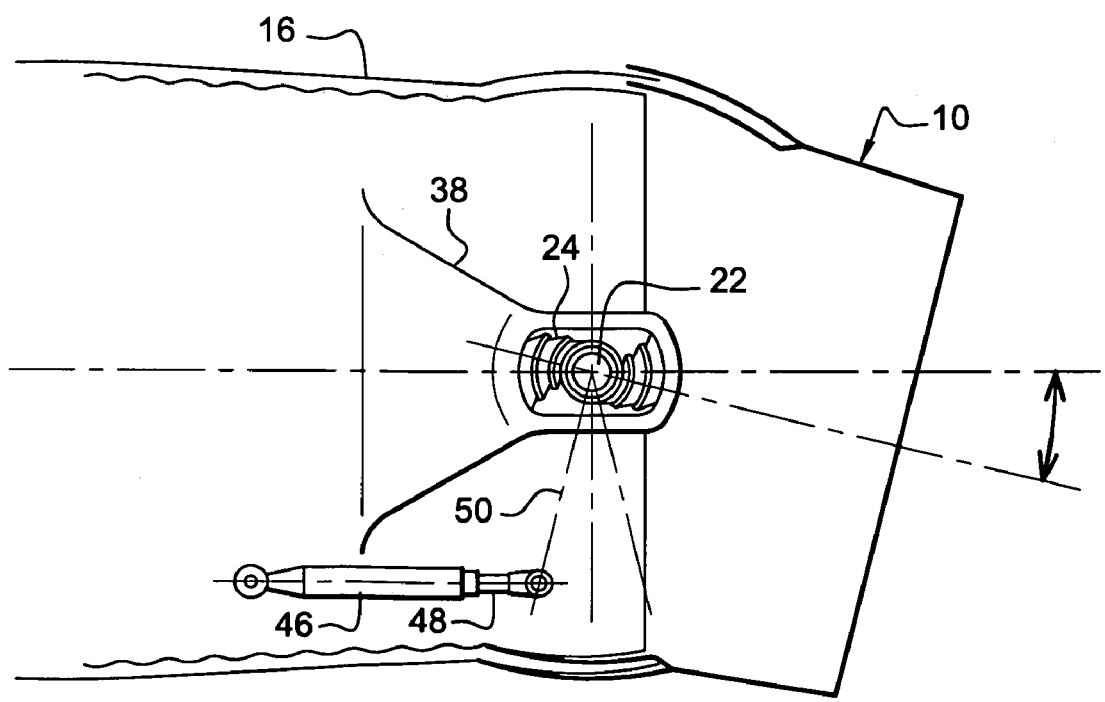
FIG. 4 is a view corresponding to FIG. 1 and illustrating the swivelling of the nozzle.

When the piston rod 48 is retracted inside the actuator 46 as represented in FIG. 4, the link 50 causes the nozzle 10 to pivot about the yaw axis 18 in the clockwise direction so as to orient the stream of gas exhausted from the nozzle 10 to the left with respect to the longitudinal axis 20 of the engine, and therefore turn the aircraft to the left with respect to its initial direction of flight.

This rotation of the nozzle deforms the articulations 24 as represented in FIG. 4. The elastomer layers 32 work in tension and in shear and exert on the nozzle a torque which tends to return it towards its initial position.

The maximum angular deflection of the nozzle 10 about the axis 18 is about 15° on either side of a central position. In practice, a rotation of 5 to 10° of the nozzle is sufficient to modify the heading of the aircraft in the desired manner.

Figure 2:
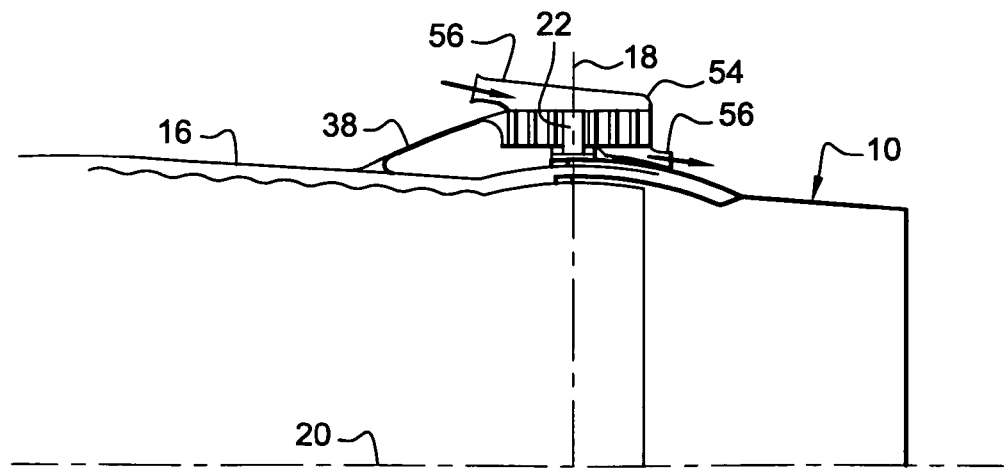
FIG. 2 is a schematic half-view in axial section on line II-II of FIG. 1.

As represented schematically in FIG. 2, the passage containing the articulation 24 may be covered by a cap 54 mounted on the lug 38 having the passage 36, this cap having an air inlet 56 oriented in the upstream direction in order, when the aircraft is in flight, to establish a flow of cooling air which passes over the articulation 24, an air outlet 58 being provided in the downstream direction below the articulation 24.

This flow of cooling air protects the articulation 24 from the heat of the combustion gases which are exhausted by the nozzle 10.

Figure 5:
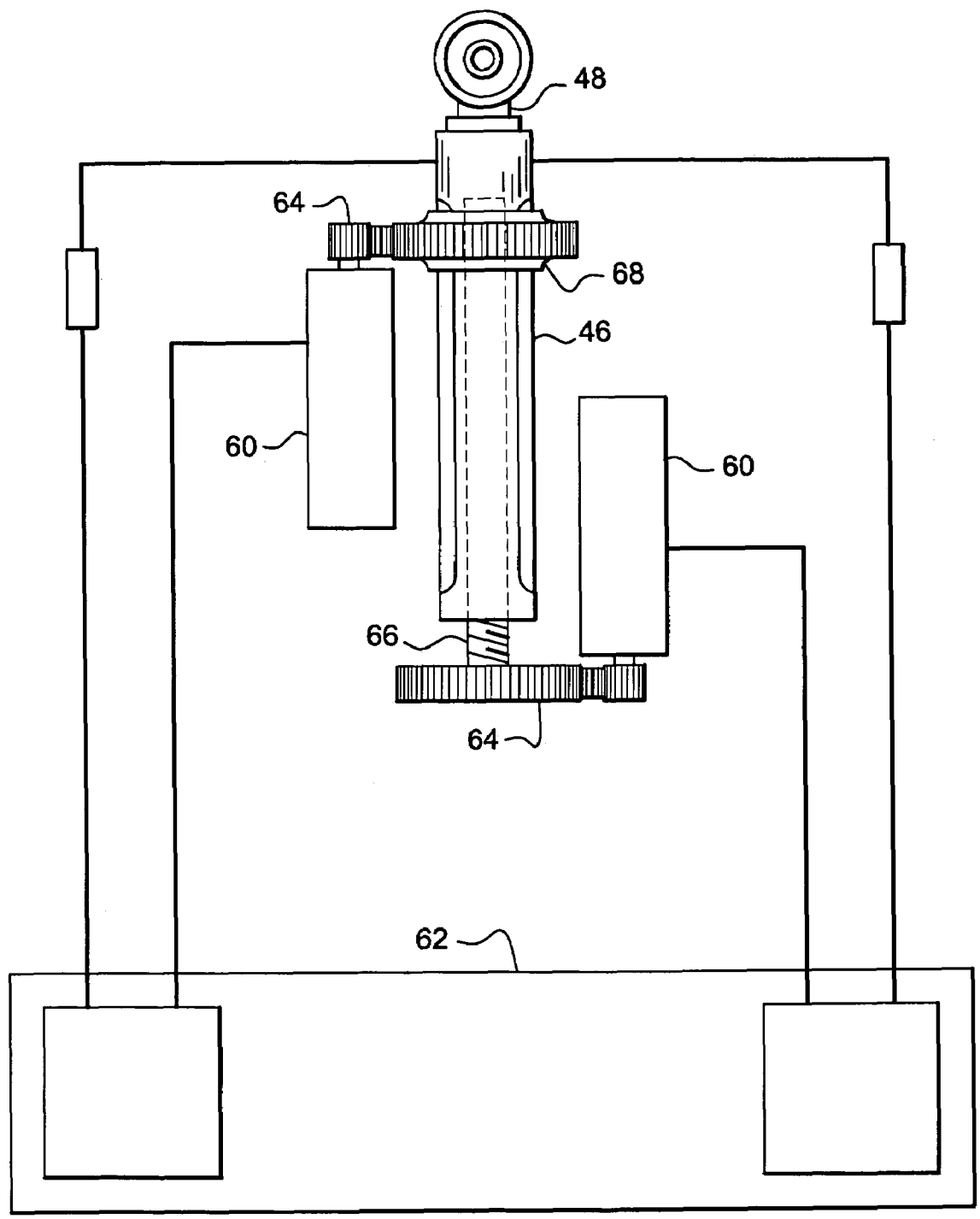
FIG. 5 schematically represents a system for controlling pivoting of the nozzle.

As represented schematically in FIG. 5, the means for pivoting the nozzle about the axis 18 are preferably equipped with two electric motors 60 for driving the piston rod 48 of the actuator 46, which in this case is a screw-type mechanical actuator. The two motors 60 are operated in parallel by an electronic control circuit 62 and each have an output shaft connected by a gear train 64 to the screw 66 of the actuator or to an outer slide ring 68 of the actuator body.

When the motor 60 whose output shaft is connected by the gear train 64 to the screw 66 of the actuator is operating, the other motor 60 is at a standstill and the rotation of the screw 66 results in a translational movement of the body of the actuator 46 along its axis, in one direction or the other, the slide ring 68 being prevented from rotating and forming a guide member for the body of the actuator 46. Conversely, when the first motor 60 is stopped or is not operating and the other motor 60 is operating, it is the screw 66 of the actuator which is prevented from rotating and which acts as a guide member for the body of the actuator 46 rotated by the slide ring 68, which is itself rotated by the gear train 64 which connects it to the output shaft of the second motor.

A failure of one of the motors can thus be overcome by the other motor.

Of course, the invention is not restricted to the embodiment which has been described in the foregoing and represented in the appended drawings. For example, the elastically deformable articulation 24 could be mounted inside a tubular pivot rigidly attached to the nozzle, around a fixed ring borne by the engine duct 16.

On the other hand, only one of the two pivots 22 could be assigned an elastically deformable articulation 24.

It would also be possible for the nozzle to be mounted pivotally about a transverse pitch axis, perpendicular to the yaw axis 18 and to the longitudinal axis 20 of the engine, using one or more elastically deformable articulations which are similar to the articulations 24 and are mounted between the duct 16 and an annular ring arranged inside this duct and bearing the articulations 24 defining the yaw axis.

It is also possible to use elastically deformable articulations 24 which do not have a lamellar or a laminated structure and in which the inner ring is connected to the outer ring by two diametrically opposed elastomer blocks not comprising any intermediate metal strips 34.

In all cases, these elastically deformable articulations have the advantage of being in one piece and of not having any moving parts, thereby avoiding the risks of seizing and jamming during a prolonged storage period. They additionally have the property of filtering and damping vibrations and sudden jerks during operation. Furthermore, they are particularly reliable and require no maintenance.

We claim:

1. A swiveling exhaust nozzle for an aircraft engine, comprising pivoting means for pivoting the nozzle about at least one transverse pivoting axis on an external engine case and displacement means for displacing the nozzle about said transverse pivoting axis, wherein the pivoting means comprise two diametrically opposed coaxial pivots outside the nozzle, at least one of which is connected to the external engine case by an elastically deformable one-piece articulation, and wherein said transverse pivoting axis passes through said elastically deformable one-piece articulation;

wherein each elastically deformable articulation comprises two elastically deformable blocks which are diametrically opposed with respect to the transverse pivoting axis and are each mounted between the pivot and a case element, one end of the blocks being rotationally fixed to the case element and their other end being rotationally fixed to the pivot.

2. A nozzle according to claim 1, wherein each pivot is connected to the external engine case by an elastically deformable one-piece articulation.

3. A nozzle according to claim 1, wherein the displacement means comprise at least one actuator mounted outside the nozzle on the case and connected to a pivot.

4. A nozzle according to claim 1, wherein each block is made of elastomer and has the shape of a cylindrical sector centered on the pivoting axis.

5. A nozzle according to claim 1, wherein each block has a laminated structure and comprises an alternating arrangement of elastomer layers and metal strips rigidly attached to one another.

6. A nozzle according to claim 1, wherein an upstream end of said nozzle has the shape of a segment of a sphere centered on the transverse pivoting axis and is guided by a correspondingly shaped end part of the external engine case.

7. A nozzle according to claim 1, wherein each elastically deformable articulation is accommodated in a housing which is formed by the case element and by a cap and which has an air inlet in its upstream part and an air outlet in its downstream part, so as to establish a stream of cooling air over the articulation when the aircraft is in flight.

8. A nozzle according to claim 1, wherein the displacement means for displacing the nozzle comprise at least one screw-type mechanical actuator which is connected to a pivot and actuated by at least one electric motor.

9. A nozzle according to claim 8, wherein the mechanical actuator is actuated by two electric motors operated in parallel by a control circuit.

10. A nozzle according to claim 1, wherein the transverse pivoting axis is a yaw axis and in that the maximum angular deflection of the nozzle about the transverse pivoting axis is about 15° on either side of a central position.

11. A drone comprising a nozzle according to claim 1.

12. A nozzle according to claim 1, wherein the displacement means rotate said elastically deformable one-piece articulation through a rotation from an initial position to a rotated position in order to displace said nozzle about said transverse pivoting axis, wherein said rotation is around said transverse pivoting axis.

13. A nozzle according to claim 12, wherein said elastically deformable one-piece articulation is elastically deformed through said rotation such that said elastically deformable one-piece articulation exerts on said nozzle a torque that tends to return said nozzle from said rotated position towards said initial position.

14. A nozzle according to claim 12, wherein said the displacement means include a single actuator connected to said elastically deformable one-piece articulation via a link.

15. A nozzle according to claim 14, wherein said single actuator, said elastically deformable one-piece articulation and said link are positioned within a plane perpendicular to said transverse pivoting axis.

16. A nozzle according to claim 1, further comprising a cap covering said elastically deformable one-piece articulation, said cap defining an upstream air inlet and a downstream air outlet configured to establish a flow of cooling air that cools said elastically deformable one-piece articulation during flight.

* * * * *